United States Patent
Rajala et al.

(10) Patent No.: US 8,475,760 B2
(45) Date of Patent: Jul. 2, 2013

(54) DEVICE AND METHOD FOR PRODUCING NANOTUBES

(75) Inventors: Markku Rajala, Vantaa (FI); Pekka Soininen, Helsinki (FI); Anssi Hovinen, Espoo (FI); Jari Sinkko, Lahela (FI)

(73) Assignee: Beneq Oy, Vantaa (FI)

(*) Notice: Subject to any disclaimer, the term of this patent is extended or adjusted under 35 U.S.C. 154(b) by 841 days.

(21) Appl. No.: 12/529,361

(22) PCT Filed: Mar. 20, 2008

(86) PCT No.: PCT/FI2008/050129
§ 371 (c)(1),
(2), (4) Date: Sep. 1, 2009

(87) PCT Pub. No.: WO2008/113892
PCT Pub. Date: Sep. 25, 2008

(65) Prior Publication Data
US 2010/0072429 A1    Mar. 25, 2010

(30) Foreign Application Priority Data
Mar. 21, 2007   (FI) .................................... 20070231

(51) Int. Cl.
*D01F 9/12*    (2006.01)

(52) U.S. Cl.
USPC ............... 423/447.1; 423/445 R; 423/447.8; 252/502; 977/734; 977/742; 977/750; 977/752

(58) Field of Classification Search
USPC . 423/445 R, 447.8, 447.1; 252/502; 977/734, 977/742, 750, 752
See application file for complete search history.

(56) References Cited

U.S. PATENT DOCUMENTS

| 6,331,690 B1 | 12/2001 | Yudasaka et al. |
| 6,692,717 B1 | 2/2004 | Smalley et al. |
| 6,855,659 B1 | 2/2005 | Zhang |
| 7,125,534 B1 | 10/2006 | Smalley et al. |
| 7,138,100 B2 | 11/2006 | Smalley et al. |
| 2002/0178846 A1* | 12/2002 | Dai et al. ..................... 73/866.5 |
| 2004/0020436 A1 | 2/2004 | Kaeppeler et al. |
| 2004/0265211 A1 | 12/2004 | Dillon et al. |
| 2006/0078489 A1 | 4/2006 | Harutyunyan et al. |
| 2006/0228289 A1 | 10/2006 | Harutyunyan et al. |

FOREIGN PATENT DOCUMENTS

| EP | 1 428 794 A2 | 6/2004 |
| JP | A-5-238718 | 9/1993 |
| WO | WO 2005/085130 A2 | 9/2005 |

OTHER PUBLICATIONS

Scott et al., "Growth mechanisms for single-wall carbon nanotubes in a laser-ablation process," Appl. Phys. A, vol. 72, pp. 573-580, 2001.

Golovina et al., "Gasification of Carbon in the Presence of Sublimation and Self-Diffusion," Fizika Goreniya I Vzryva, vol. 5, No. 2, pp. 249-257, 1969.

Kotakoski et al., "Irradiation-assisted substitution of carbon atoms with nitrogen and boron in single-walled carbon nanotubes," Nuclear Instruments and Methods in Physics Research B, vol. 228, pp. 31-36, 2005.

Nasibulin et al., "Studies on Mechanism of Single-Walled Carbon Nanotube Formation," Journal of Nanoscience and Nanotechnology, vol. 6, pp. 1233-1246, 2006.

Puretzky et al., "Dynamics of single-wall carbon nanotube synthesis by laser vaporization," Appl. Phys. A, vol. 70, pp. 153-160, 2000.

* cited by examiner

*Primary Examiner* — Mark Kopec
*Assistant Examiner* — Haidung Nguyen
(74) *Attorney, Agent, or Firm* — Oliff & Berridge, PLC

(57) ABSTRACT

The invention relates to an apparatus for producing nanotubes, the apparatus being adapted to produce doped and/or undoped single-walled or multi-walled nanotubes, the apparatus comprising at least a thermal reactor. In accordance with the invention, the reactor is at least of the hottest part thereof and at least partly manufactured from a material that is at least partly sublimed into the thermal reactor as a result of the thermal reactor being heated, and the sublimed material at least partly participates in the growth of the nanotubes.

16 Claims, 6 Drawing Sheets

US 8,475,760 B2

DEVICE AND METHOD FOR PRODUCING NANOTUBES

FIELD OF THE INVENTION

The invention relates to an apparatus for producing nanotubes, and particularly to an apparatus for producing nanotubes, the apparatus being adapted to produce doped and/or undoped single-walled or multi-walled nanotubes, and the apparatus comprising at least a thermal reactor. In accordance with the invention, the production of nanotubes takes place in the apparatus in a thermal reactor, and the material of the thermal reactor participates in the production process of the nanotubes. The device of the invention enables the production of multi-walled and single-walled carbon nanotubes and doped nanotubes, such as B-doped and N-doped single-walled carbon nanotubes. An embodiment of the invention also enables the production of other nanotubes, such as boric nitride nanotubes. The invention further relates to a method for producing nanotubes and particularly to a method for producing doped and/or undoped single-walled or multi-walled nanotubes.

The device constituting the object of the invention comprises means for heating the thermal reactor to a temperature exceeding 2000° C. and most preferably to a temperature exceeding 2300° C., at which temperature the production material of the thermal reactor is significantly sublimated into the thermal reactor. In an embodiment of the invention, other material, such as boron, required in the production of nanotubes, is sublimated into the thermal reactor instead of carbon. Furthermore, the device constituting the object of the invention comprises means for supplying the gaseous, liquid and solid precursory materials, required in the production of nanotubes, into the thermal reactor. The metal particles required for catalyzing the efficient production of single-walled carbon nanotubes can be produced from solid metal sources preferably located in the immediate vicinity of the thermal reactor and obtaining the thermal energy required for the sublimation of the metal from the thermal reactor. The device constituting the object of the invention may further comprise means for introducing the raw materials into the thermal reactor either before the hottest part of the reactor or thereafter, allowing the nanotubes to be doped advantageously. Furthermore, the device constituting the object of the invention comprises means for collecting nanotubes, the collection preferably taking place by means of thermophoresis. The final application of the nanotubes may also directly serve as the collection substrate.

DESCRIPTION OF THE PRIOR ART

Nanotubes are small, cylindrical molecules having a diameter of one nanometer (single-walled nanotubes) to a few dozens of nanometers (multi-walled nanotubes). The length of the nanotubes may vary from a few nanometers to several micrometers. The most generally studied and used nanotube is a carbon nanotube (Carbon Nano Tube, CNT), but boric nitride nanotubes (BN) are also produced. Nanotubes have a plurality of potential applications in the storage of energy (the storage of hydrogen, efficient batteries and condensers), in molecular electronics (field emission devices, transistors), sensors, composite materials and other applications. As regards their atomic structure, carbon nanotubes are either semiconductors or metal-like.

Carbon nanotubes are mainly manufactured in two manners: by a high-temperature process (laser ablation) and by chemical vapour deposition (CVD). It is extremely difficult to manufacture the tubes with exactly the desired properties.

In the laser ablation process, the ablation target is usually made from graphite containing about 1 atomic percent and nickel (Ni) and cobalt (Co). Nickel and cobalt serve as a catalyst for the growth of the nanotube. The target is heated to a temperature of about 1000 to 1500 K at a protective atmosphere (usually argon, Ar), after which a pulsed laser beam is usually directed thereto. The laser beam evaporates the graphite and nanotubes are generated in the ablation plume. A plurality of different mechanisms has been proposed for the generation process. In the process, at least fullerene balls ($C_{60}$) are generated, which are likely to further disintegrate in the repeated laser bombing, and the light carbon gas molecules generated from the fullerenes (particularly $C_2$) have a significant contribution to the growth of carbon nanotubes (Appl. Phys. A 72, 2001, Scott, C. D. et al., Growth mechanisms for single-wall carbon nanotubes in a laser-ablation process, pages 573 to 580). In the basic method, nanotubes having varying diameters are generated, which is suggested to be caused by the catalyst metals and carbon evaporating in different manners at different points of the target. To remove this problem, U.S. Pat. No. 6,331,690, published 18 Dec. 2001, NEC Corporation, discloses a method wherein the graphite target and the nickel/cobalt alloy target are bombed separately with laser radiation, resulting in the generation of a graphite vapour plume and a catalyst metal vapour plume, the combination of which results in a catalysis of the growth of single-walled carbon nanotubes.

The laser ablation process generally requires a hot oven, wherein the ablation is carried out. U.S. Pat. No. 6,855,659, published 15 Feb. 2005, NEC Corporation, teaches that by manufacturing the target at least partly from fullerene-type carbon, the surface of the target being preferably curved, allows the temperature of the oven to be lowered to a temperature of 500° C.

Appl. Phys. A 70, 2000, Puretzky et al., Dynamics of single-wall carbon nanotube synthesis by laser evaporation, pages 153 to 160, teaches that the plume generated in the laser ablation process initially contains atoms and molecules, not particles. Carbon particles are first (in less than a millisecond from the laser pulse) condensed from the plume and only thereafter catalyst metal particles (2 to 3 ms after the pulse), and that the growth of carbon nanotubes takes place in the long term (in the order of 3 seconds) after the pulse. It is most likely that the carbon particles serve as condensation cores for the growth of catalyst particles, and then the catalyst metal particles serve as growth substrates for the carbon nanotubes.

Even though high-quality single-walled carbon nanotubes can be produced by the laser ablation method, the problem of the method is scalability and prior art laser ablation devices are incapable of producing large numbers of carbon nanotubes.

Carbon nanotubes may also be produced by the CVD process. Journal of Nanoscience and Nanotechnology, Vol. 6, 2006, Nasibulin, A. G., et al., Studies on Mechanism of Single-Walled Carbon Nanotube Formation, pages 1 to 14, discloses a method for producing carbon nanotubes in an aerosol generator of the fluidized bed type. Reaction gases (CO, $H_2/N_2$) are introduced into the generator, and catalyst metal particles are produced in the reactor by means of a hot wire by the catalyst metal being evaporated from the hot wire. The generator is manufactured from stainless steel, and the hot parts from aluminium oxide ($Al_2O_3$). In the process, Fe particles are first generated through an evaporation/condensation reaction. CO then reacts forming carbon particles on the surfaces of the catalyst particles. Carbon is diffused through the catalyst particle and along its surface, thus growing a carbon nanotube. Different variations of the CVD method are disclosed e.g. in patent application WO 2005/085130, 15 Sep. 2005, Canatu Oy; U.S. Pat. No. 6,692,717, 17 Feb. 2004, William Marsh Rice University; U.S. Pat. No. 7,125,534, 24 Oct. 2006, William Marsh Rice University; U.S. Pat. No. 7,138,100, 21 Nov. 2006, William Marsh Rice University; patent application US 2004/0265211, 30 Dec. 2004; patent application US 2006/0078489, 13 Apr. 2006; and patent application US 2006/0228289, 12 Oct. 2006.

The CVD process includes more possible process variations than the laser ablation process. Particularly the construction and materials of the reactor device, particularly the impurities released from the materials at a high temperature, the gas impurities etc. essentially affect the yield of the production of single-walled carbon nanotubes, in particular.

The properties of carbon nanotubes may be changed if the different materials are allowed to be adsorbed into the walls thereof. Fluorine (F) doping allows the conductivity of a nanotube to be lowered to the level of an insulator, nitrogen (N) and boron (B) doping allows a carbon nanotube to be converted into an n and p type semiconductor, respectively. It is thus essential in the manufacture of carbon nanotubes that the manufacturing method and device provide good opportunities for the functionalization of carbon nanotubes. N and B doping may be performed in connection with both laser ablation and CVD processing. Theoretically, it has been proved that ion radiation with B and N ions is an efficient manner of doping carbon nanotubes (Nuclear Instruments and Methods in Physics Research B 228, 2005, Kotakoski, J., et al., Irradiation-assisted substitution of carbon atoms with nitrogen and boron in single-walled carbon nanotubes, pages 31 to 36).

There exists a need for a device for producing doped or undoped nanotubes, particularly single-walled carbon nanotubes, under well-controlled conditions continuously or almost continuously.

SUMMARY OF THE INVENTION

The invention relates to an apparatus for producing nanotubes in a manner solving the above-described prior art drawbacks. The objects of the present invention are achieved with an apparatus, which is characterized in that the reactor is at least of the hottest part thereof and at least partly manufactured from a material that is at least partly sublimed into the thermal reactor as a result of the heating of the thermal reactor, and the sublimed material at least partly participates in the growth of nanotubes. The object of the invention is further achieved with method, which is characterized in that, in the method, the thermal reactor is heated in a manner making its manufacturing material at least partly sublime into the thermal reactor, and the sublimed material at least partly participates in the growth of nanotubes.

In an embodiment of the invention, the thermal reactor of the device is manufactured from graphite. By heating the graphite in a controlled manner to a high temperature, typically a temperature exceeding 2000° C. and preferably a temperature exceeding 2300° C., gaseous carbon molecules are generated. These carbon molecules at least partly participate in the growth of carbon nanotubes. Thus, by manufacturing the hot chamber of the manufacturing apparatus of carbon nanotubes from graphite heated to a high temperature, an advantageous environment substantially free from impurities can be created for the growth of carbon nanotubes.

In an embodiment of the invention, the cylindrical thermal reactor, manufactured from graphite, is heated inductively by means of an induction coil placed around the cylinder. In this embodiment, electrical current passes in the circumferential direction of the cylinder, whereby a temperature profile advantageous to the growth of nanotubes can be easily generated in the cylinder. Inductive heating also provides the possibility for an embodiment wherein the thermal reactor is composed of a plurality of interlinked parts, which may be manufactured from a different material and each of which may be heated by means of separate induction coils, when necessary.

In an embodiment of the invention, a metal cylinder is placed inside the inductively heated cylinder manufactured from graphite, a metal cylinder manufactured from boron, for example, which is heated owing to heat conducted or radiated from the graphite cylinder and from which a material participating in the growth of nanotubes is sublimed into the thermal reactor.

The device of the invention is also characterized in that a high reactor temperature enables the evaporation of materials required in the process, such as catalyzing metals, directly in the immediate vicinity of the reactor chamber, and the temperature gradient of the device enables evaporation exactly at the desired temperature.

The device of the invention is also characterized in that the surface from which material is sublimed may be structured to increase the sublimation area.

The device of the invention is also characterized in that the high wall temperature of the device substantially prevents growth on the walls of the hot chamber of the generator, whereby the carbon nanotubes generated can be efficiently conveyed along with the gas flows into the collector part of the device.

The device of the invention is also characterized in that materials required for the CVD growth of nanotubes can be introduced into the inside of the device, and thus manufacture nanotubes also by utilizing the CVD process. Carbon monoxide CO or hydrocarbon $C_xH_y$, such as methane $CH_4$, for example, may be introduced into the inside of the device.

DETAILED DESCRIPTION OF THE INVENTION

Figure 1:
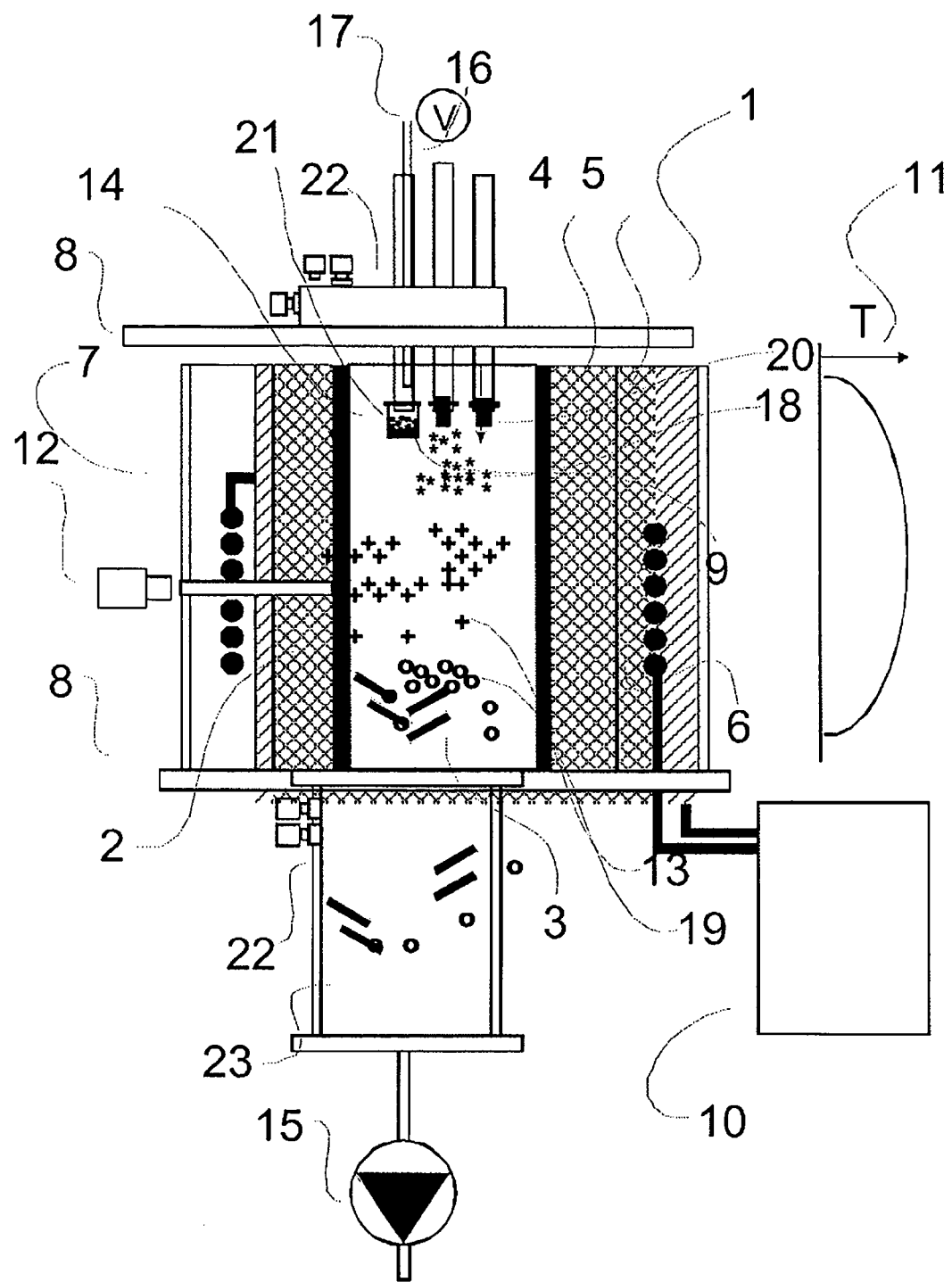
FIG. 1 shows an embodiment of the device of the invention. For the sake of clarity, the drawing only shows the details required for understanding the invention. Structures and details irrelevant to the understanding of the invention and evident to a person skilled in the art are omitted from the figure to emphasize the characterizing features of the invention.

FIG. 1 shows an embodiment of the invention, wherein a production device 1 for nanotubes includes a thermal reactor 2, at least the substantially hottest site thereof being manufactured from graphite, wherein nanotubes 3 are generated, the nanotubes 3 being typically doped or undoped carbon nanotubes. Around the thermal reactor 2 is arranged a thermal insulation 4 and an insulation tube 5, which insulate the thermal reactor from an induction coil 6. The thermal reactor 2 and the induction coil 6 constitute a heating system for the nanotube production device 1. The heating system is typically arranged inside a body 7 of the nanotube production device 1, and in the example, end flanges 8 are attached to the upper and lower portions of the body that enclose the heating system substantially inside the body 7. The body 7 and the end flanges 8 are typically water-cooled. For the sake of clarity, the figure does not show the cooling system. For the same reason, the figure does not show all structures arranged in the nanotube production device that do not substantially belong to the scope of the invention, such as structures employed for feeding different gases, for example.

Along part of the way, the heating system surrounds a metal rod 9 arranged inside the nanotube production device 1. In the example, the metal rod 9 is arranged inside the thermal reactor 2 through an opening located in the upper end flange 9. It is evident to a person skilled in the art that the metal rod 9 can be arranged inside the thermal reactor 2 also through an opening located in the lower end flange 8.

Alternating current is supplied to the induction coil 6 surrounding the thermal reactor 2 from a power source 10. The frequency of the alternating current is typically between 1 and 100 kHz. The current generates a vortex in the thermal reactor 2 made from graphite, the vortex circulating along the circumference of the thermal reactor in the case of FIG. 1. The resistance of the thermal reactor 2 causes a power loss, which causes the thermal reactor 2 to warm up. In the embodiment of the example, at least the hottest part of the thermal reactor 2 is manufactured from graphite, but it may also be manufactured from another carbon-containing material, such as silicon carbide. As a result of the warming up, a temperature profile 11 is generated in the thermal reactor 2. The temperature of the thermal reactor 2 may be measured with a pyrometer 12.

Figure 2:
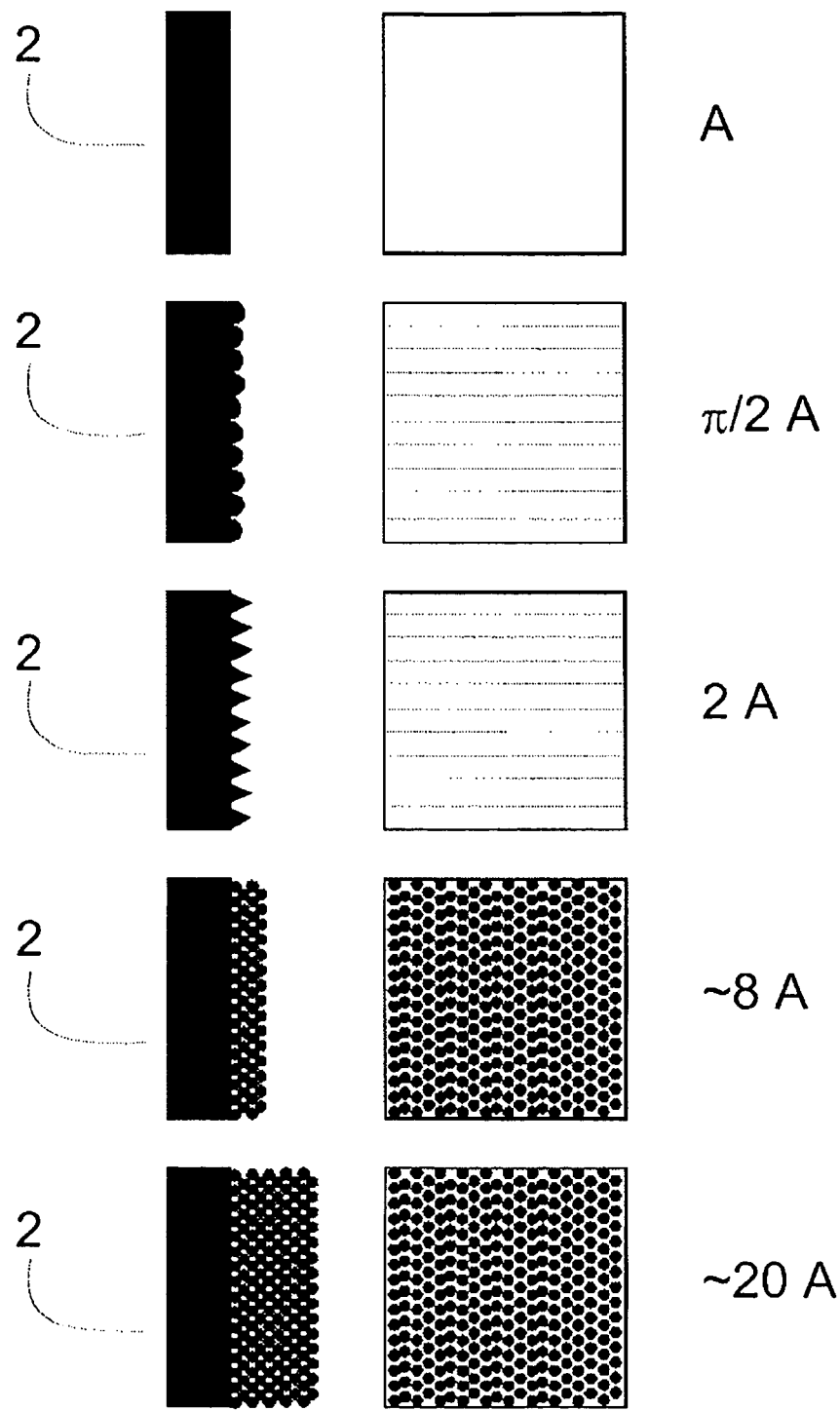
FIG. 2 shows the structuring of the graphite part of the device of the invention by way of example.

From the thermal reactor 2, carbon molecules 13 are released to the inside of the thermal reactor. The sublimation speed of carbon depends on the temperature of the thermal reactor 2, the speed of gases 14 flowing in the thermal reactor 2, and the (under)pressure of the thermal reactor 2, which is generated in the thermal reactor 2 with a pump 15. For the sake of clarity, FIG. 1 does not show the cooling system of the pump 15 either. The typical speed of release of carbon molecules in an argon flow, at a temperature of 2700° C. is in the order of 5 to 10×10 to 5 g/cm$^2$s (Fizika Goreniya i Vzryva, Vol. 5, No. 2, 1969, Golovina, E. S. & Kotova, L. L., Gasification of carbon in the presence of sublimation and self-diffusion, pages. 172 to 176). In order to increase the number of carbon molecules released, the graphite part of the thermal reactor 2 may be structured as shown in FIG. 2. It is evident to a person skilled in the art that the size of the structure may vary from a millimeter scale to a nanometer scale, its aim being the achievement of a large sublimation area. The sublimation area may also be increased with an at least partly porous structure. The sublimation speed may be affected also by the pressure of the gas in the oven, and by adjusting the amount of gas supplied from gas lines 22 and the suction flow achieved with the pump 15, a gas pressure deviating from the normal pressure, either underpressure or overpressure, may be created inside the oven.

From the warm thermal reactor 2, thermal radiation is directed to the metal rod 9, the radiation heating said metal rod. For preventing excessive thermal conduction to the outside of the apparatus, the metal rod 9 is typically attached to a tube 16 made from quartz glass. For preventing excessive heating of the other structures of the oven, the thermal insulation 4, typically of graphite wool, is arranged between the thermal reactor 2 and the induction coil 6. The insulation tube 5 is typically manufactured from quartz glass and it serves as an electric insulation between the electrically conductive graphite and the induction coil 6.

Metal fume 18 is sublimed from the heated metal rod 9, whose temperature may be measured with a thermal element 17, into the thermal reactor 2. The amount of sublimated metal fume 18 depends on the temperature of the metal rod 9, the material, and the pressure and gas flows in the thermal reactor 2. As the metal, transition elements, such as Fe, Co, Ni, Mo, for example, or metal alloys may be used. It is evident to a person skilled in the art that depending on the metal and/or metal alloy, the metal rod is placed at a different point in the thermal reactor (at a different temperature), and the temperature profile of the device of the invention provides a good opportunity for the use of different metals. It is also evident to a person skilled in the art that the device may comprise more than one metal rod 9.

The metal 18 evaporating from the metal rod 9 nucleates/condenses as the gas flows 14 convey the metal fume 18 past the hot zone of the thermal reactor 2. The nucleation of the carbon molecules 13 sublimed from the thermal reactor may be of significance to the condensation of the metal fumes 18. Condensed metal particles 19 catalyze the growth of the carbon nanotubes 3 and at least some carbon molecules 13 participate in the growth of the carbon nanotubes 3.

The metal rod may also be of another metal than that required for the catalysis, for instance boron, whereby the boron evaporated from the metal rod 20 may be used for doping the nanotubes.

Solid precursory materials may also be introduced into the thermal reactor 2 by placing the solid precursory material, for instance a powder of the solid precursory material, in a platinum crucible 21, which is introduced into the thermal reactor 2 to a suitable temperature.

For increasing the production speed of carbon nanotubes and for doping the nanotubes, gases necessary for growing nanotubes, such as carbon monoxide CO, hydrogen $H_2$, hydrocarbons ($CH_4$, $C_2H_6$, $C_3H_8$, . . . ), nitrogen $N_2$, argon Ar or the like, may be introduced from the gas lines 22 into the thermal reactor 2. At least some gas lines 22 may be located at the rear portion of the thermal reactor, whereby the gases are not conveyed through the hottest part of the thermal reactor.

The nanotubes generated in the thermal reactor 2 may be collected onto the inner surface of a cooled collection tube 23 by utilizing thermophoresis. The thermophoretic collector may also be structured in such a manner that the final application of the nanotubes serves as the collector substrate.

FIG. 2 shows different surface structures usable for increasing the sublimation area in the thermal reactor 2. It is evident to a person skilled in the art that there exist other manners, different from those of FIG. 2, for increasing the sublimation area.

Figure 3:
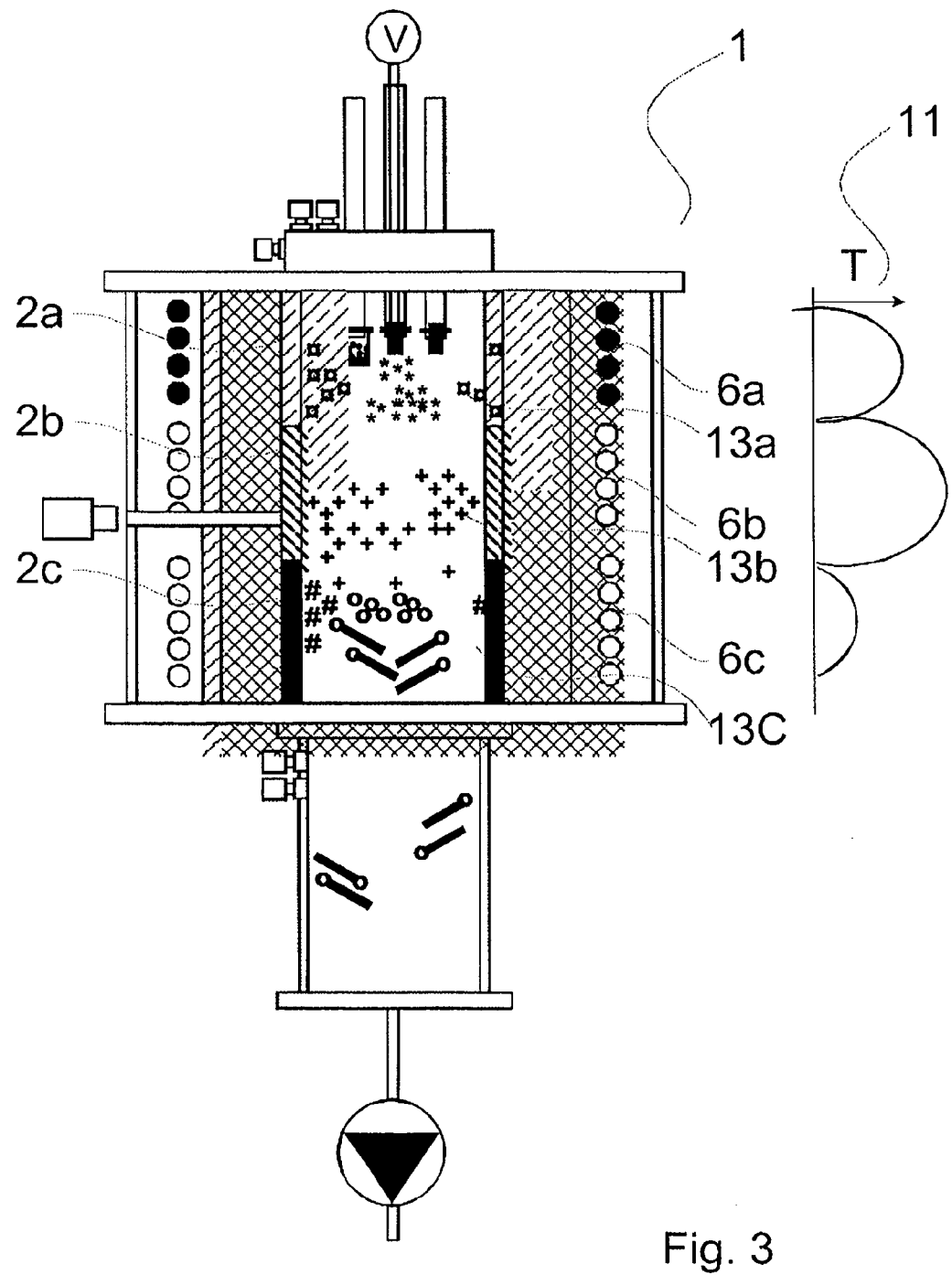
FIG. 3 shows an embodiment of the invention by way of example, wherein the thermal reactor is composed of a plurality of parts, whose materials may be different.

FIG. 3 shows an embodiment of the invention. For the sake of clarity, only the points different from those in FIG. 1 are numbered in the figure. In this embodiment of the invention, the graphite-walled thermal reactor 2 is divided into three parts 2a to 2c, each of which can be heated separately by means of induction coils 6a to 6c. Induction heating preferably provides the potential for producing a temperature profile 11 with a varying shape in the thermal reactor. The material composition of each zone 2a to 2c may be different, i.e. zone 2a may be of boron-doped graphite, zone 2b of graphite whose inner surface is mainly composed of fullerene atoms $C_{60}$, and zone 2c of cobalt-doped graphite, for example. Fumes 13a to 13c containing different carbon are sublimed from each zone 2a to 2c.

Figure 4:
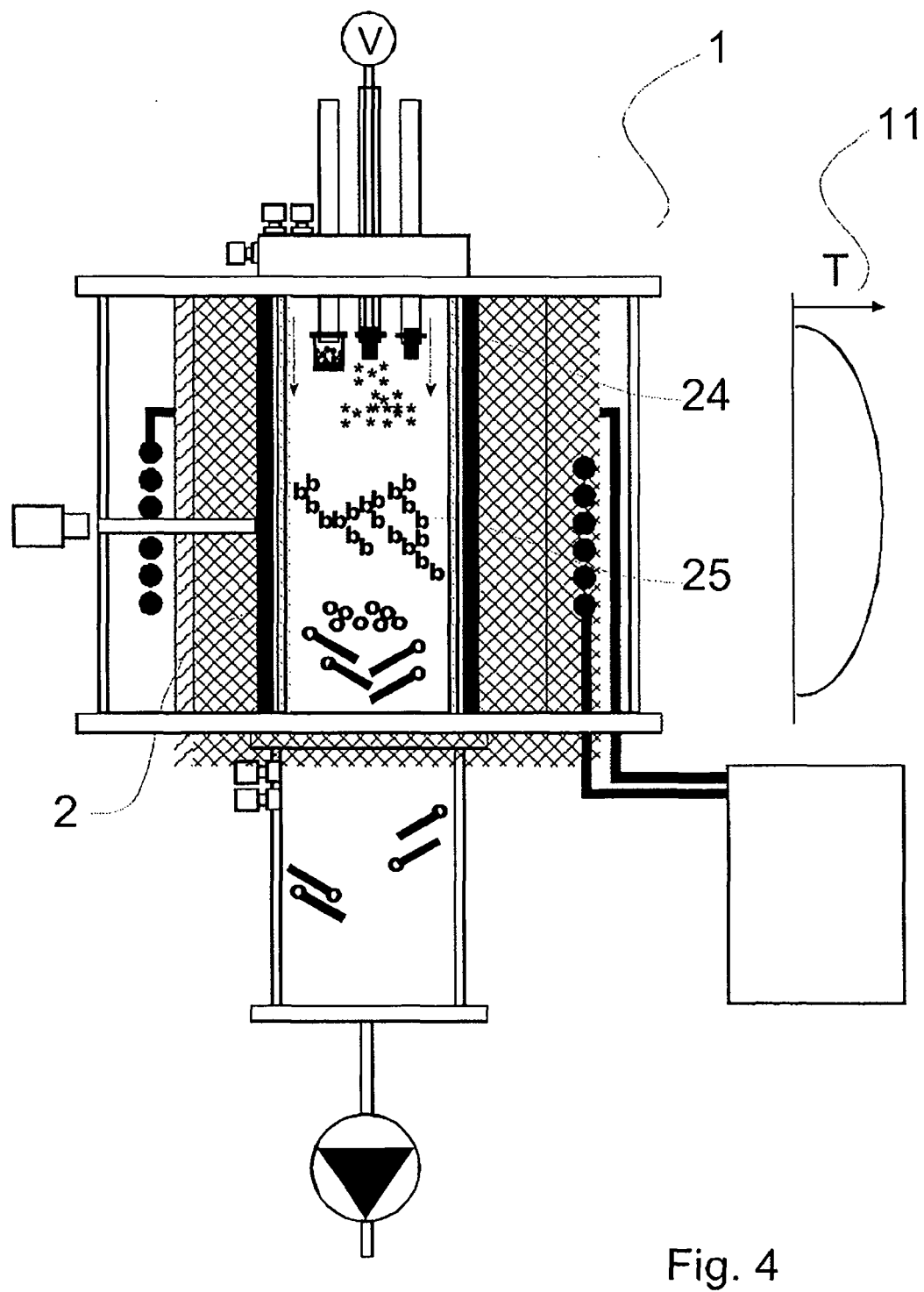
FIG. 4 shows an embodiment of the invention by way of example, wherein the thermal reactor is composed of a heated graphite part and a boron-containing portion therein, from where boron is sublimed into the thermal reactor.

FIG. 4 shows an embodiment of the invention. For the sake of clarity, only the points different from those in FIG. 1 are numbered in the figure. In this embodiment of the invention, the graphite cylinder 2 serves as the heat source of the thermal reactor, but a boron cylinder 24 is placed inside the cylinder. This being so, the heat radiating and/or conduced from the graphite cylinder makes the boron cylinder heat up, whereby boron fume 25 starts to be released from it. The selection of suitable catalyst metal materials and the supply of nitrogen to the thermal reactor enable the production of BN nanotubes with the apparatus according to the example.

Figure 5:
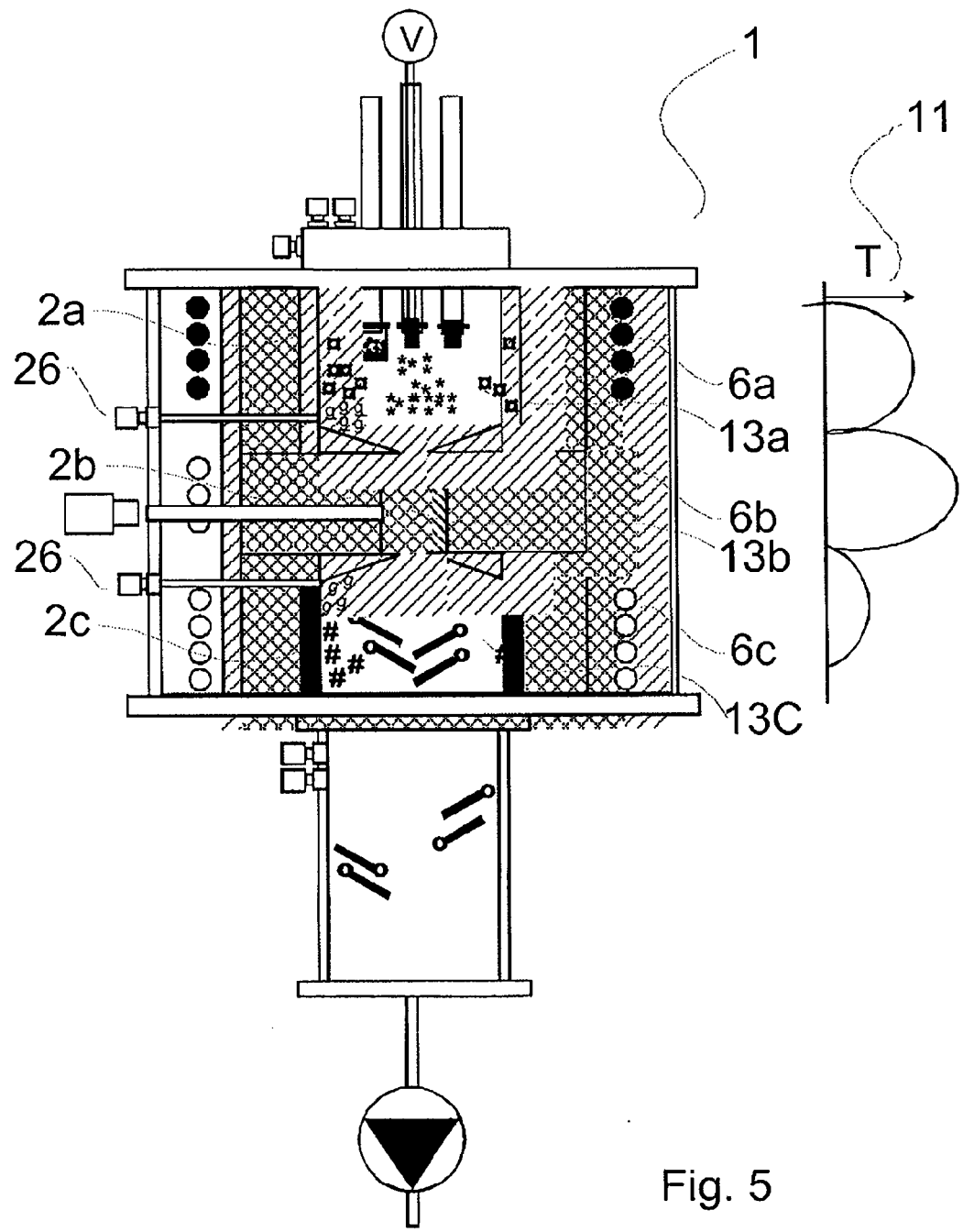
FIG. 5 shows another embodiment of the invention by way of example.

FIG. 5 shows an embodiment of the invention. For the sake of clarity, only the points relevant to this embodiment are numbered in the figure. In this embodiment of the invention, the graphite-walled thermal reactor 2 is divided into three parts 2a to 2c, each of which can be heated separately by means of induction coils 6a to 6c. Induction heating preferably provides the potential for producing a temperature profile 11 with a varying shape in the thermal reactor. The material composition of each zone 2a to 2c may be different, i.e. zone 2a may be of boron-doped graphite, zone 2b of graphite whose inner surface is mainly composed of fullerene atoms $C_{60}$, and zone 2c of cobalt-doped graphite, for example. Fumes 13a to 13c containing different carbon are sublimed from each zone 2a to 2c. The diameter of each zone 2a to 2c may be different, so that the gas moving in the thermal reactor may have a different speed in the different zones 2a to 2c. The gas flow may be introduced into the thermal reactor also from points 26 between the zones 2a to 2c. This enables the supply of CVD growth components to the correct positions as regards the process without any harmful preliminary reactions. It is evident to a person skilled in the art that solid sources may also be similarly supplied to the thermal reactor from the points between the zones 2a to 2c, and that these points between the zones may also be used for monitoring the process. Furthermore, the design of the thermal reactor shown in FIG. 5 may provide 'flow points' and 'still water points' of the movement of the gases and materials, such as their diffusion, by means of which the time constant of the process can be adjusted different in the different parts of the thermal reactor. Furthermore, the construction of the thickness of the wall of the thermal reactor and the distance of the wall from the induction coil may be used to influence the temperature profile of the thermal reactor.

Figure 6:
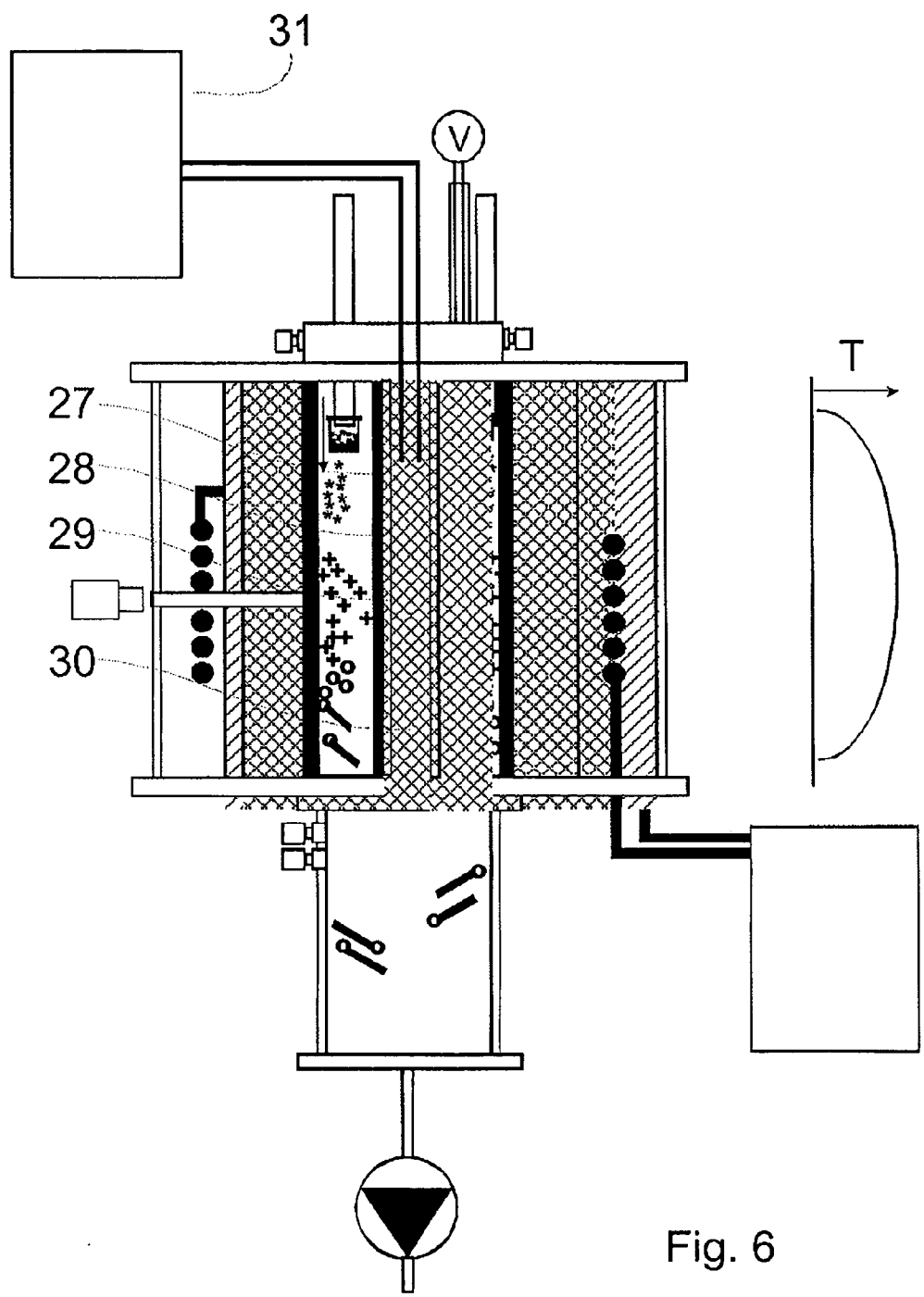
FIG. 6 shows yet another embodiment of the invention by way of example.

FIG. 6 shows an embodiment of the invention. For the sake of clarity, only the points relevant to this embodiment are shown in the figure. In this embodiment of the invention, the thermal reactor is composed of an outer tube and an inner tube 27 that are heated separately and on the inside of which is further arranged a thermal insulation 28, a quartz glass tube 29 and an induction coil 30, wherein circulating current is adjusted with a power source 31. This embodiment allows the sublimation area of the material, required in the process, to be further increased, since the size of the reaction space does not necessarily increase as the sublimation area increases. The structure is advantageous as regards the scaling of the device.

In an embodiment of the invention, the supply of wall material of the thermal reactor, such as graphite, into the device is arranged in such a manner that as the wall is sublimed, the wall tube can be continuously supplied to the inside of the device, whereby the process is preferably rendered continuous. It is evident to a person skilled in the art that a similar type of supply of solid material may be implemented continuously also for other process materials.

The above-described embodiments of production apparatuses for nanotubes are not dependent on the shape of the thermal reactor. Accordingly, the thermals reactor may have embodiments deviating from the cylindrical form presented in the figures. The structure of the exemplary embodiments of the invention may also be varied otherwise in a manner conforming to the spirit of the invention. Consequently, instead of using an induction coil, the thermal reactor may be heated by using a resistance heating type of heating by connecting power supply to the graphite part by galvanic coupling. The presented embodiment of the invention should therefore not be interpreted to restrict the invention, but the embodiments of the invention may vary freely within the inventive characteristics disclosed hereinafter in the claims.

The invention claimed is:

1. A method for producing doped and/or undoped single-walled or multi-walled nanotubes, comprising:
   heating a thermal reactor, wherein the thermal reactor is manufactured from a heating material that is at least partly sublimed into the thermal reactor as a result of the heating, and the sublimed material at least partly participates in a growth of nanotubes.

2. The method as claimed in claim 1, wherein the sublimed material is at least from a hottest part of the thermal reactor.

3. The method as claimed in claim 1, comprising heating at least the hottest part of the thermal reactor to a temperature, wherein carbon molecules are sublimed from a wall surface of the thermal reactor as a result of the heating, and said carbon molecules at least partly participate in the growth process of carbon nanotubes.

4. The method as claimed in claim 3, wherein the temperature of the hottest part of the thermal reactor is at least 2000° C.

5. The method as claimed in claim 3, wherein the temperature of the hottest part of the thermal reactor is at least 2300° C.

6. The method as claimed in claim 1, further comprising generating a temperature profile in the thermal reactor by means of the heating thereof.

7. The method as claimed in claim 6, further comprising adjusting the temperature profile of the thermal reactor by changing a wall thickness of the thermal reactor.

8. The method as claimed in claim 6, further comprising adjusting the temperature profile of the thermal reactor by changing a distance of a wall of the thermal reactor from an induction coil used for heating the thermal reactor.

9. The method as claimed in claim 1, wherein the thermal reactor is composed of more than one zone, and the different zones are manufactured from different materials.

10. The method as claimed in claim 9, comprising supplying process raw materials required in the growth process of the nanotubes between the different zones.

11. The method as claimed in claim 9, comprising heating the different zones with different induction coils.

12. The method as claimed in claim 1, wherein the material to be sublimed is a transition element.

13. The method as claimed in claim 1, wherein the material to be sublimed is boron.

14. The method as claimed in claim 1, wherein the material to be sublimed is fullerene.

15. The method as claimed in claim 1, further comprising supplying raw materials required in the growth process of nanotubes into the thermal reactor.

16. The method as claimed in claim 1, further comprising collecting the nanotubes produced by means of thermophoresis.

* * * * *